Patented June 8, 1926.

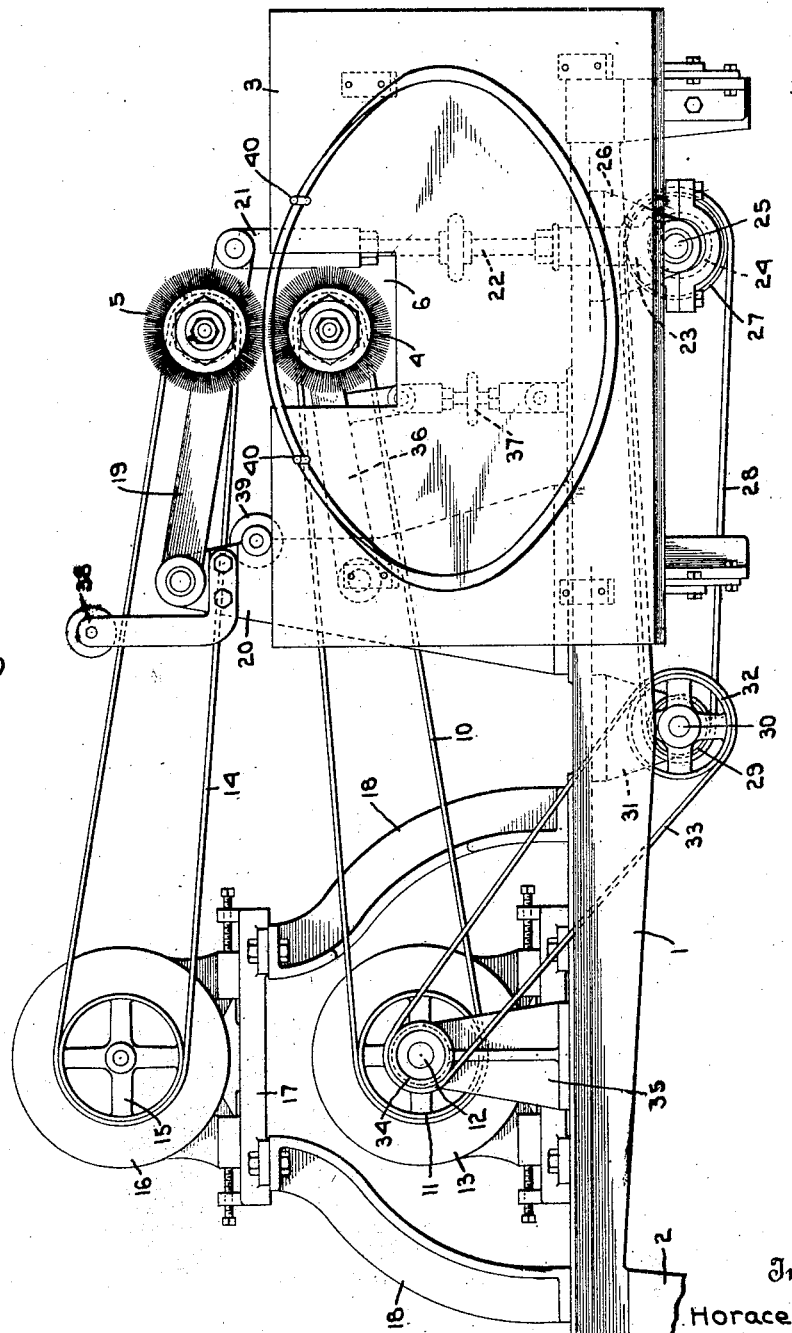

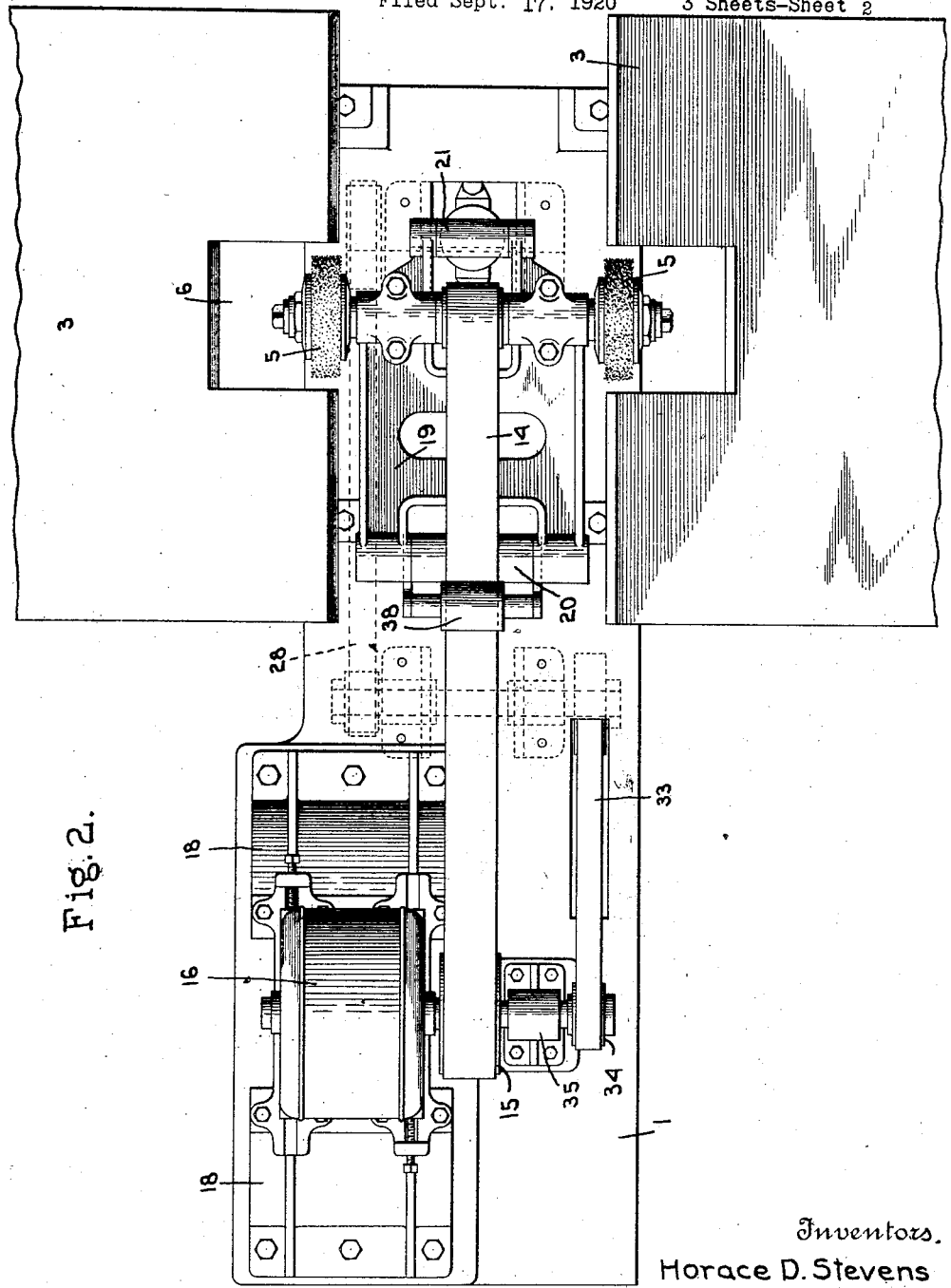

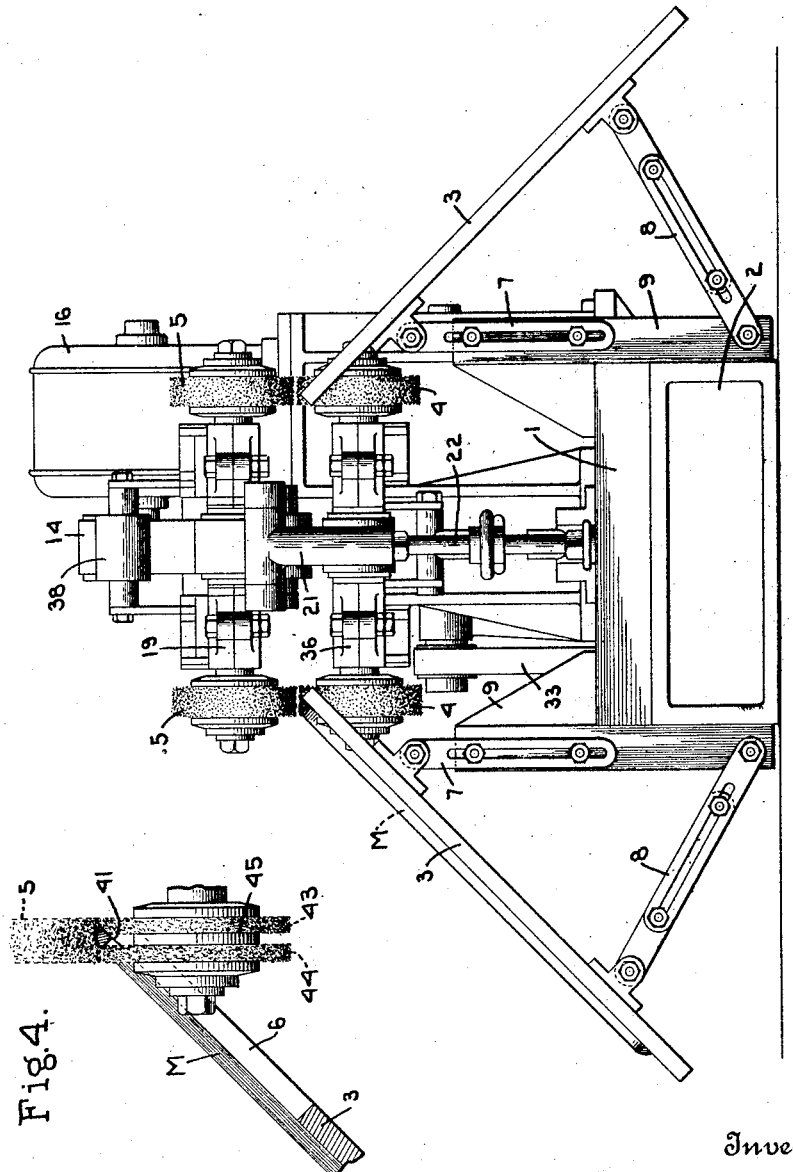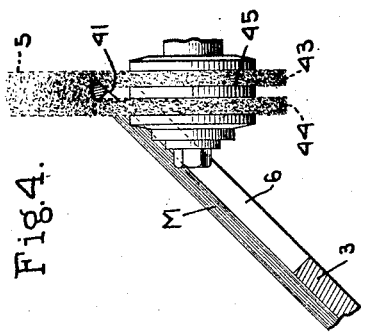

UNITED STATES PATENT OFFICE.

HORACE D. STEVENS AND EDWARD D. PUTT, OF AKRON, OHIO, ASSIGNORS TO THE FIRESTONE TIRE AND RUBBER COMPANY, OF AKRON, OHIO, A CORPORATION OF OHIO.

BUFFING MACHINE.

Application filed September 17, 1920. Serial No. 410,891.

This invention relates to buffing machines, particularly to a machine adapted to buff the beads built into the marginal portions of a pneumatic tire, especially for that type of tire known as the straight side tire. In the preparation of such beads, after being formed in the shape of an annulus, they are given a partial cure to secure the bead covering and keep them intact, after which they are coated with cement to aid in connecting them with the rubber and fabric plies of the tire carcass. In receiving the semi-cure, a scale or film of soapstone forms on the surface of the bead, to which the cement does not adhere, and in order to successfully apply the beads to a tire carcass, they have to be freed from this coating. This was done formerly by passing the bead around a buffing wheel, which operation has been a tedious one, as the bead was held and revolved by hand.

Our invention provides a machine for buffing these tire beads, in which the beads are insured of uniform buffing throughout the entire surface. The improved apparatus requires very little attention, while it rapidly and expeditiously performs its functions.

The above and other objects will more fully appear from the following description and drawings and will be especially pointed out in the claims.

In the drawings:—

Fig. 1 is a side elevation of the improved buffing apparatus embodying the invention.

Fig. 2 is a plan view thereof.

Fig. 3 is an end view thereof.

Fig. 4 is an enlarged detail view showing a modified form of buffing wheel.

In the drawings, 1 designates the base of the machine supported upon suitable legs or standards 2. The bead M is supported by a table 3 angularly adjustable with relation to a pair of buffing wheels 4 and 5 being located one above the other and adapted to receive the bead between them. The table 3 is cut away at 6 to allow for closer adjustment to the wheels, it being adjusted by slotted links 7 and 8 attached to a bracket 9 on the frame 1. As will be seen from an inspection of Fig. 3, the table 3 is capable of a wide range of position.

In the present invention we make the machine with duplicate apparatus driven from the same power; and so constructed, it comprises a unit of two bead buffing machines, taking up very little floor space. As both of the apparatus are similar in construction, one only will be described.

The buffing wheels 4 and 5, adapted to receive the bead between them, are rotated in opposite directions, the lower wheel 4 being connected by a belt 10 to a pulley 11 on the shaft 12 of a motor 13, and the upper wheel being connected by a belt 14 to a pulley 15 on the shaft of a second motor 16. The buffing wheels are mounted in the same vertical plane and to actuate them in the desired manner, hereinafter described, we employ two motors to save a plurality of confusing connections. The motor 13 is mounted on the frame 1. and the motor 16 is slidably mounted directly over the first named motor on a bearing plate 17 carried by a pair of standards 18 on the frame 1.

The upper buffing wheel 5 is rotatably carried in an oscillating arm 19 pivotally supported at one end by a bracket 20 on the framework 1. At the other end, the arm 19 is pivotally connected to a reciprocating link 21 adjustably connected at 22 to an eccentric strap 23 surrounding an eccentric 24. The eccentric 24 is carried by a shaft 25 mounted in brackets 26 attached to the underside of the base plate 1, which shaft also carries a pulley 27. As will be seen from the foregoing, the rotation of the eccentric 24 transmits to the upper buffing wheel a vibratory movement. The constant raising and lowering of the wheel 5 gives the wheel a jabbing action on the bead which aids in freeing the coating of soapstone from the bead and roughens the surface without grinding or injuring the bead covering.

A belt 28 connects the pulley 27 to another pulley 29 on a revolving shaft 30, which is located in brackets 31 depending from the frame 1 and carries a second pulley 32 belted to the shaft 12 of the motor 13 by a belt 33 and pulley 34. To aid in supporting the pulley 34 and the motor shaft 12, we have mounted on the frame 1 a bearing bracket 35 midway of the shaft 12.

The lower buffing wheel 4 is rotatably carried by an arm 36 pivotally connected at one end to the bracket 20. The height of the wheel 4 is governed by an adjustable connection 37 attached at one end to the arm 36 and at the other end to a boss on the base 1. The adjustment of the height of both the buffing wheels 4 and 5 afford a wide range of adjustability between the ends of the bristles.

Also carried by the bracket 20 is a pair of idler rollers 38 and 39, one over the belt 14 and one under the belt 14, the object being to prevent the flapping or whipping of the belt that would result from the vibrating motion of the upper buffing wheel shaft.

The bead M is placed on the table 3, a plurality of guide pins 40 being used, if desired, for centering the bead on the table, and one side is pushed between the buffing wheels. The rotation of the wheels, each turning in a different direction, serves to feed the bead between them. If the bead moves too fast, the operator retards it by placing his hands against it. One complete revolution of the bead should be sufficient to thoroughly buff the bead. Heretofore, the beads were held in the hands against a single buffing wheel and one side of the bead only could be buffed at one time.

Referring to Fig. 4, we have provided a pair of buffing wheels, in which the lower one is especially adapted for the buffing of a tire bead. The bead M is triangular in shape and the inside corner 41 would likely be buffed too briskly and the cover worn through, so we make the lower wheel 42, which also buffs the two sides of the bead adjacent the corner 41, in two parts 43 and 44. In the center of the wheel between the parts 43 and 44 is placed a spacer 45. As will be seen in Fig. 4, this allows the bristles to work directly on the sides of the bead, referred to above, and not directly on the corner 41.

It is to be understood that the mechanism described herein is illustrative of the preferred embodiment of the invention, but that it is in no way restrictive and that the invention contemplates the operation of a buffing apparatus adapted to buff an article and to vibrate the buffing wheel over the article to perform the function set forth.

We claim:—

1. In a machine for buffing circular tire beads, a support for the bead, means on the support for guiding the bead for rotation about its axis, rotary brushes above and below the bead and means for vibrating one of the brushes toward and away from the bead.

2. In a machine for buffing circular tire beads of triangular cross section, a table for supporting the bead, and rotary brushes at the side of said table, the plane of the brushes being at an obtuse angle to the plane of the table.

3. In a machine for buffing circular tire beads, of triangular cross-section, an inclined table for supporting the bead and rotary brushes at the side of said table, the plane of the brushes being vertically arranged.

4. In a machine for buffing circular tire beads, a table for supporting the bead, means on the table to guide the bead for rotation about its axis, a pair of brushes at the side of the table in the path of the bead, and a vibratory mounting for one of said brushes to cause it to beat upon the bead during its rotation.

5. In a machine for buffing circular tire beads, an inclined table for supporting the beads, guiding devices on the table for the bead, a pair of rotary brushes in the path of the bead, the brushes being arranged in a vertical plane, and a vertically vibratory mounting for one of said brushes to cause it to beat upon the surface of the bead.

6. In a buffing machine, an inclined support for the work, a rotary brush above the work, a vibratory mounting for the brush and means to vibrate the brush rapidly during its rotation to beat upon the work.

HORACE D. STEVENS.
EDWARD D. PUTT.